Jan. 13, 1970 W. H. KLIEVER 3,488,997
WEIGHT AND CENTER OF GRAVITY INDICATION SYSTEM
Filed Aug. 22, 1966 2 Sheets-Sheet 1

INVENTOR.
WALDO H. KLIEVER

ATTORNEY

INVENTOR.
WALDO H. KLIEVER

United States Patent Office 3,488,997
Patented Jan. 13, 1970

1

3,488,997
WEIGHT AND CENTER OF GRAVITY INDICATION SYSTEM
Waldo H. Kliever, Cleveland Heights, Ohio, assignor to Pneumo Dynamics Corporation, Cleveland, Ohio, a corporation of Delaware
Filed Aug. 22, 1966, Ser. No. 574,086
Int. Cl. G01m 1/12
U.S. Cl. 73—65        3 Claims

ABSTRACT OF THE DISCLOSURE

A system for measuring the weight supported by each landing gear of an aircraft for gross weight and center of gravity determinations consisting of sensor apparatus associated with each gear adapted to be responsive to deflection of portions of the gear to provide output indications proportional to only gravitational weight load on the gear by rejecting deflection effects upon the gear caused by extraneous forces. A pair of arms are rigidly mounted to horizontally spaced portions of the landing gear and extend toward a common location between the mounts, a sensor being utilized to provide signals indicative of the relative movement of the arms at the common location for application to electrical circuitry for determining only aircraft weight supported on each gear, and combining the weight indications for total weight or center of gravity measurements.

DISCLOSURE

This invention relates to aircraft weight and center of gravity indication systems and more particularly to an improvement in the type of system wherein the deflection of portions of the landing gear assembly are utilized to provide a signal related to the weight of the aircraft.

Prior art systems of this type have utilized strain gauges attached to the landing gear or deflection sensing devices to register the load carried in either the strut or axle portions of landing gear assemblies to provide signals which are proportional to the weight of the aircraft. The prior art measuring systems usually utilize a part of the structure of the landing gear assembly which deflects proportional to the amount of the aircraft weight which is supported by that landing gear, and then by summing the signals from each of the landing gear provide an indication of total weight, and similarly make a computation of the center of gravity of the aircraft based upon the weight supported by each landing gear. The prior art devices are devised to measure the actual weight supported each of the landing gear and for the most part, ignore other effects which might cause errors in the readings obtained. These errors can be due to side loading, which is a lateral friction force acting on the tire at the ground, or drag loading which is a longitudinal force on the tire at the ground. These forces can be caused by ground turns during taxi or towing, wind, structural deflections of the aircraft during loading and unloading of the aircraft, unevenness of ramp upon which the aircraft is situated and others. Drag load especially, can be considerably reduced if the wheel brakes are unlocked and the aircraft is free to roll, however during almost any static condition of the aircraft, some side and drag load forces exist. It has been determined that the side and drag load effect cannot be ignored in the design of a system wherein accuracies on the order of one percent are desirable.

Thus it is an object of this invention to provide a system for determining the true weight and center of gravity of an aircraft, even though subject to side load and drag load forces.

It is another object of this invention to provide a system for measuring the weight and center of gravity of an aircraft wherein the measurement is made in the landing gear assemblies to detect the deflection of a structural member of the assembly due to a combination of forces and to render an output indicative of the gravtitational weight of the aircraft.

It is a further object of this invention to provide measurement apparatus which is at least partially attached to a structural member of a landing gear assembly subject to a plurality of forces, and which will isolate only the forces due to the weight of the aircraft to render a signal proportional to that force.

Other objects and advantages of the present invention will become apparent as the following description proceeds.

To the accomplishment of the foregoing and related ends, the invention, then, comprises the features hereinafter fully described and particularly pointed out in the claims, the following description and the annexed drawings setting forth in detail illustrative embodiments of the invention, these being indicative, however, of but several of the various ways in which the principles of the invention may be employed.

Figure 1:
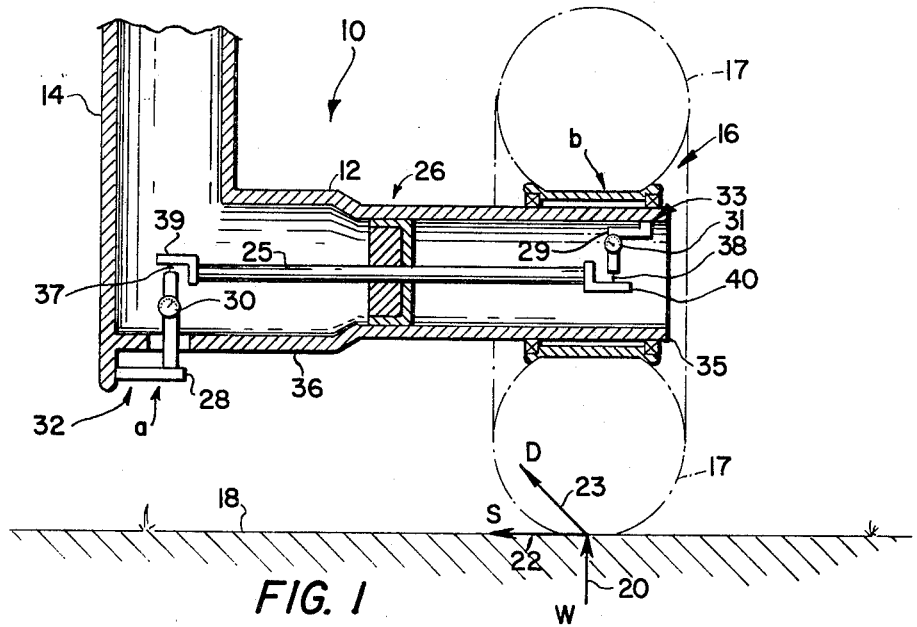
FIG. 1 is a partial cross-sectional view of the axle and strut of a cantilever type landing gear showing sensor devices for detecting relative deflections of the axle.

The apparatus of the invention is suited for sensing the relative deflections in landing gear assemblies or a portion of any type landing gear although only cantilever and bogie type landing gear embodiments are described. The term deflection used in the description of this invention refers to the displacement of a portion of the landing gear structure from some reference position which may be the non-loaded position or the term deflection may be defined as the vertical displacement of any point along the elastic axis relative to the neutral axis. The neutral axis of an axle or beam of a landing gear, although not shown in the drawings, may be precisely located in practice if desired, and is a useful term in describing the operation of this invention. It is best described as an imaginary line extending parallel with the axle and centrally located within the axle, ideally being the line of transverse symmetry. Elastic axis is the term applied to the curve taken by the neutral axis when the axle undergoes deflection due to applied loads. In referring to the relative deflection between two separated locations along the structure the term is used to designate the difference in deflection of the two points usually measured at some common location. The sensors utilized in this invention are attached to each landing gear of the aircraft to determine the portion of aircraft weight supported by that gear and include separate sensors for each main gear and for the nose gear. For purposes of this description, however, only one landing gear of an aircraft will be shown and it will become evident that the same arrangement is used in the other gear of the aircraft and could be used in any other similar gear.

Referring now to FIG. 1, there is shown a typical landing gear 10 with an axle 12 and a portion of a strut 14 leading from an aircraft, with a wheel 16, including tire 17, rotatably mounted on the axle and in contact with the ground 18. The axle 12 and strut 14 are in a cantilever configuration and the weight of the aircraft which is transmitted from the strut 14 to the axle 12 and through the wheel 16 to the ground is shown as a single force vector 20. When the vertical loads such as the gravitational weight of the aircraft are applied to the cantilever axle-wheel assembly, the axle 12 bends in proportion to the applied load. When side loads due to wind force for example, affect the aircraft, they cause a lateral or horizontal force to be applied to the strut and thus the wheel and tire, and because of the frictional contact of the tire 17 with the ground, a force will be developed which is also shown as a single force vector 22 in FIG. 1. This force tends to bend the axle in proportion to the side load in a manner similar to the bending caused by the gravitational force of the aircraft. In an absolute sense, that is, with respect to the ground, the deflection due to the side load will add to or subtract from the deflection of the axle due to the vertical load and at any location in the axle it would be impossible to distinguish by the absolute deflection of the axle whether the load applied to the wheel is due to gravitational weight or the side load force.

A third force vector 23 is shown in FIG. 1 acting upon the tire 17 at its point of contact with the ground 18. This is the drag force vector and lies along a line mutually perpendicular to the weight vector 20 and side load vector 22, thus being coincident with the path of travel of the wheel 16. If the wheel 16 is braked against movement a relatively large drag force can be developed while if the wheel is free to rotate a relatively small force will occur due primarily to bearing friction and the like. The drag force creates both a torsional force in the axle 12 causing relative rotation between the portion of the axle 12 nearest the strut 14 and the outermost portion of the axle 12, and a bending tendency from end to end of the axle in a plane perpendicular to the plane of the drawing in FIG. 1 and passing through the axis of the axle 12. It will be shown hereinafter that the effects due to drag force may be largely ignored in the cantilever type construction shown in FIG. 1, but are significant in the bogie gear of FIG. 2.

Figure 2:
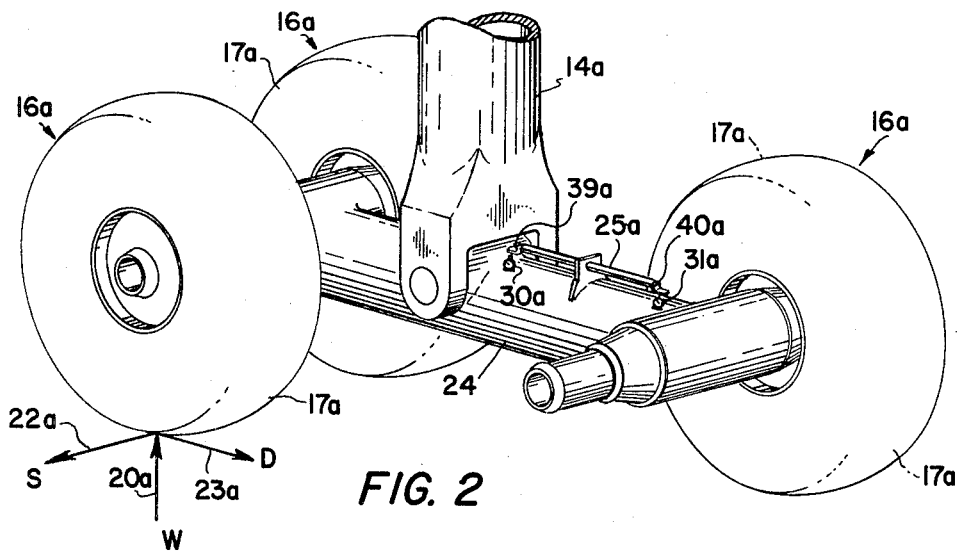
FIG. 2 is an isometric view with parts removed showing the apparatus of the invention in relation to a bogie type landing gear.

Referring now to FIG. 2, there is shown a bogie landing gear with the sensor device of the invention mounted on the exterior of the main housing 24. Reference numerals with an *a* appended thereto are used to identify parts corresponding with those shown in FIG. 1 and aid in understanding the similarity of operation.

Main strut 14a leads from the aircraft and transmits forces affecting the aircraft to the longitudinally extending housing 24 of the bogie which is rockably mounted on strut 14a for partial rotation in a vertical and longitudinal plane, but rigidly prevented from lateral movements. Housing 24 in turn carries axles rotatably supporting wheels 16a including tires 17a in contact with the ground. Force vectors 20a, 22a, 23a representing respectively weight, side load and drag load forces are shown at the point of contact of one tire 17a with the ground. It will be understood that similar forces occur at each tire but are not shown so as not to unduly complicate the drawing. The force vectors maintain the same relationship to each tire as that described in FIG. 1, however it will be noticed that a different force affects the vertical deflection of the housing 24 because of the parallel alignment of the housing with the path of travel of the wheels 16a. Thus, the gravitational weight of the aircraft transmitted through strut 14a causes a vertical deflection of the housing 24 from end-to-end. Drag load acting along the line of vector 23a causes a torque in the wheels 16a tending to bend the housing 24 from end-to-end thereby creating a vertical deflection. Side load force tends to twist housing 24 in relation to strut 14a in both a horizontal and lateral plane, however neither of these motions creates a vertical displacement of the housing 24.

It is seen that the drag load force in the bogie gear creates a similar vertical deflection as the side load force in the cantilever gear and the side load force of the bogie gear and the drag load of the cantilever gear create negligible vertical deflection. Thus, although only the cantilever gear construction will be detailed hereinafter, it will be understood that a corresponding condition is applicable in a bogie or other type gear relating to the axle 12 and side load force of the cantilever gear to the housing 24 and drag load force of the bogie gear.

Referring again to the cantilever gear of FIG. 1, it should be understood that the deflection created in the axle due to the combination of these forces is not easily describable since it depends upon the configuration of the particular axle and the magnitude and direction of the forces causing the deflection. However, it can be stated that the vertical deflection at any point along the length of the axle is proportional to the combination of the two forces of interest to the weight and center of gravtity measurement and it has been determined that an equation stating this relationship can be formulated. If known vertically-directed gravitational and side load forces affect an axle which is supplied with suitable instrumentation then the coefficients relating the portion of deflection created by each force can be determined. These coefficients are constant for that particular location within the limits of measurement of concern and may be utilized in an equation describing the absolute deflection sensed at that point. This procedure may be repeated at a second position along the axle to provide a second equation with different but yet known coefficients for each of the forces. Thus there are provided deflection sensing devices at two positions along the axle with the deflection measured at each position being comprised of known proportions of the two forces of interest. It is then possible to calculate from the measured deflections, the quantity of each component force, combining to cause the deflections.

It is also noted that the weight and side load forces may act in various relative proportions along the length of the axle to deflect the axle in a curve which is not entirely predictable. Thus, occasionally sensor locations similarly related to the weight and side load forces may be realized and it should be appreciated that redundant, unusable indications will be produced in these locations. These specific locations are not exactly predeterminable, however by following the conditions set forth hereinafter such redundancy will usually be avoided.

In order to achieve a high degree of accuracy in this system of measurement, it is necessary that the deflections be sensed under prescribed conditions. First, the location of the deflection-sensing devices is relevant and it is necessary to locate these positions so that appreciable differences in the coefficients of at least one force are obtained in each location. Since it is usually desired that only the weight force be determined and since this force provides most of the deflection measured, it is desirable that the coefficients relating the side load forces suitable difference at each point of measurement. It is also necessary that the coefficients for the sensors be substantially different in ratio to provide two distinct relationships of the loads to the sensor indications, so that a distinct solution of the equations may be obtained. Coefficients identical in ratio produce redundant indications with no solution of the equation possible, while those differing only slightly in ratio while providing a solution for the equation, reduce the useable signal and introduce unnecessary error in the system. Second, in determining the value of the coefficients at each location, it is necessary to supply test forces of quantities within the range of forces which will be encountered under actual conditions. As in any measuring system, there is an allowable tolerance range within which accurate results will be obtained. It is especially true in this system, wherein a complex bending of a beam is occurring. Third, since only the two forces of concern are being accounted for, it is necessary to take precautions that no other forces are affecting the deflection of the axle, or if they are, then some other additional means of correction must be made. This is especially of concern in the weighing of aircraft wherein, for example, wind forces may produce a lift or drag load with a resulting increase or decrease in apparent weight.

From an analysis based upon knowledge of the type of deflection occurring in a landing gear of this configuration and confirmed by actual testing of this weighing system, it has been determined that there are locations between the sensor mounts such that if the deflection sensing device is arranged to sense the relative deflection of the mounts at one of those locations, the indication is a function of the weight of the aircraft only and does not contain a component due to the side load upon the aircraft. It is clear that at such a location an indication directly proportional to weight can be obtained thereby reducing the complexity of the system since only a single sensor need be employed.

The term elastic axis, as described previously, is used to denote an imaginary laterally extending locus describing the instantaneous deflection of the axle, thus it may be a straight line describing the axis of symmetry of the axle in the undeflected condition, and under load conditions it will be a curve reflecting the curvature of the axle. The apparatus of the invention although primarily described as related to the elastic axis, may be physically displaced from the center of the axle to cooperate with other portions of the axle and still maintain similar relationships and provide similar information. The invention is not to be construed as limited to the showings in the drawings. Although this is a preferred embodiment, many other forms of apparatus will suffice to accommodate the principles of this invention. Thus, although in FIG. 1 displacement sensing takes place within the axle near the central axis, to be described hereinafter, FIG. 2 shows that the sensing may take place as well outside the housing using the same principles of measurement.

The structure of the mechanism of the FIG. 1 embodiment of the system is as follows:

A sensor bar 25 is rigidly mounted within the interior of the axle 12 at a location 26 intermediate the ends of the axle. First 30 and second 31 sensor devices are mounted on arms 28, 29 which are attached to the axle 12 at two locations 32, 33 along the axle 12 on either side of the mounting location 26 of the sensor bar 25 for measuring displacement at locations $a$ and $b$ along the axle 12. The sensor devices 30, 31 are shown as dial indicators in FIG. 1 but it will be understood that they may also be strain gauges, gauged displacement sensors, differential transformers or any other force or movement transducers which will provide an output directly proportional to the relative displacement between the sensor bar 25 and the point of attachment of the sensors 30, 31 on the axle as measured at $a$ and $b$. It will also be understood that the sensor bar 25 and the arms 28, 29 may be of any suitable length and may be affixed to the axle 12 in any convenient manner.

When forces are applied to the axle through the intermediaries of the strut 14 and the wheel 16 in a vertical and lateral direction as shown in FIG. 1, representing a combined weight and side load force, the axle 12 will deflect with the right hand portion 35 of the axle 12 deflecting greatly and the left hand end portion 36 remaining relatively stationary with relation to the strut 14.

The sensor devices 30, 31 will indicate the deflection of the locations 32, 33 translated to locations $a$ and $b$, in relation to the respective end of the sensor bar 25 which translates the deflection of axle portion 26 to locations $a$ and $b$. The movable probes 37, 38 of the sensors abut adapters 39, 40 rigidly affixed to the sensor bar. The sensor bar 25 is a rigid member which although it moves in relation to the ground, does not deflect from end to end. Since the bar 25 is affixed at one point along the axle 12 in its mount and is approximately parallel to the undeflected axis of the axle 12, it can be stated that the bar 25 describes or is parallel to the tangent to the elastic axis at the instantaneous portion of the axle 12 to which it is affixed.

Similarly, although the sensors 30, 31 are shown in FIG. 1 as being affixed to the axle housing on arms 28, 29 it should be understood that other suitable configurations are possible. Thus the sensors 30, 31 may be attached directly to the housing of the axle 12 so that locations 32 and $a$ coincide, as could locations 33 and $b$. However it will be pointed out hereinafter that the structure shown in FIG. 1 provides advantageous results. By using the arm and bar apparatus, it is obvious that the relative lengths of each may easily be changed to alter the locations $a$ and $b$ along the axle 12 to satisfy the previously pointed out requirements regarding the coefficients which relate the displacement indications with the forces affecting the deflection of the axle 12. The arms 28, 29 could also be mounted substantially in line with the bar 25 so that they contact one another with one designed to deflect in response to their relative movement when the axle 12 is loaded. It is then possible to utilize strain gauge techniques to measure the deflection of the bar, for example, relating the measurement to the deflections of the axle, and providing an electrical output for convenience of further calculations. Thus, it is seen that the indications provided by the sensors 30, 31 are measurements of the relative displacements between points 26, 32 and 26, 33 along the axle 12 of the cantilever-type landing gear axle as measured at locations $a$ and $b$.

The mounting locations 26, 32, 33 of the sensor bar 25 and the sensor arms 28, 29 do not have any definite relation to the particular axle 12 in which deflections are being sensed and any number of different combinations of locations could be utilized. It is also not necessary that the sensor devices be located within the axle 12 and this invention is not to be construed as so limited. This embodiment is preferred since it utilizes protected available space, but the measurements could as well be performed on the exterior of the axle housing as shown in FIG. 2, or in fact, even remotely, as by light sensing or any other measurement technique. It is only necessary that deflections of portions of the axle be measured.

As has been mentioned previously, both the cantilever gear of FIG. 1 and the bogie gear of FIG. 2 are subject to bending and twisting tendencies from drag and side load forces respectively which may introduce an error in the measurement performed by the sensors 30, 31 and 30a, 31a respectively and affect the accuracy of the system. The effects of these forces depend on the sensor location with respect to the elastic axis and the type of gear, and suitable configuration of interengagement between the components of the sensing apparatus is usually employed to alleviate this problem or alternatively a corrective quantity is added to the total weight indication. For purposes of this invention however, it is only the deflection in a vertical plane which is of significance and suitable measures are employed to eliminate these other extraneous factors. Thus in FIG. 1, adapters 39, 40 may be flat plates where it is the bending tendency of the axle 12 in a horizontal plane which is predominant and in FIG. 2, adapters 39a, 40a may be in the form of arcuate segments matching the curvature of the housing 24, where the rotative tendency is predominant.

Further, the accuracy of the system is dependent, somewhat, upon the constancy of the physical relation of the sensors 30, 31 to ground engagement of the aircraft. Thus, change in the tire 17 profile may affect primarily the vertical length of the lever arm providing the sensor output indications and it is necessary that tire pressures be maintained within close limits to avoid such error. Alternatively, if the sensors are located in approximately a common horizontal plane, then variations in tire profile will affect the sensors approximately equally and no significant error will be introduced.

Even though the locations of the sensor bar 25 and sensors 30, 31 are not otherwise critical, as aforementioned there are certain locations of these components whereat advantageous results accrue. Thus these locations are usually selected so that the indications of the sensors provide favorable measurement conditions. That is, the relationship of the two indications may be important in obtaining accurate results and as has been pointed out previously, if the ratio of coefficients relating the forces to the indications are significantly different for each sensor, then more accurate results will be obtained in computing the vertical force.

Similarly, there may be found a location where a sensor will be insensitive to the side load force whereat deflection is directly proportional to aircraft weight supported on that gear. At such a location the coefficient which describes the part of the sensor output that depends on side load will have the value zero. It should be clear that it is then necessary to use only that one of the sensors 30, 31, shown in FIG. 1, which is at such a location, and that the second sensor or the output of the second sensor may be eliminated or ignored. The apparatus for such an embodiment will be identical to that shown in FIG. 1 utilizing, for example, sensor 30, bar 25, arm 28 and the mounting locations 26 and 32. Sensor 31, arm 29 and the right-hand portion of bar 25, beyond the mounting location 26, are not utilized, and since there is no mechanical interrelation with the utilized sensor 30, may be eliminated from the assembly.

In theory, the location of this single sensor lies along the axle 12, between the mounting locations 26 and 32, at the intersection of tangents drawn to the elastic axis of the axle at points 26 and 32, which elastic axis is referenced solely to applied side loads and whose curvature is not caused by vertical loads. This location could be computed for a particular axle and mounting arrangement, however due to the many variables involved, in practice, a rough location for such a single sensor is determined from an analysis of the axle and strut configuration, and the final location is usually ascertained by an experimental procedure, applying test side loads to the axle, until no change in sensor indication is realized.

It should also be clear that the side load force represented by force vector 22 in FIG. 1 may occur in a direction opposite to that shown, dependent upon position of the aircraft and wind direction, for example, and of course, such forces are experienced oppositely in relation to the axles in landing gear on the two sides of the aircraft. Although the actual deflection of the axle is different in this condition and may even be an S-shaped curve, the teachings of this invention are still valid and the desired deflection measurements can be obtained.

As has been discussed previously if known side load and weight forces are applied to an axle of the configuration shown in FIG. 1, the outputs of the sensor devices 30, 31 may be described to reflect the proportional effect due to each of these forces and this is known as a calibration of the system. Thus if unknown forces are applied to the axle, the portion of the sensor output due to each of the component forces can be ascertained.

The method of calibration of the system is as follows:

Known side load and vertical forces in at least two different combinations are applied to the axle 12 of the landing gear assembly to deflect the axle 12 and to provide a pair of indications for each of the sensor gauges 30, 31 or alternatively graphs may be made of a series of applied combinations of forces. Thus it is assumed that each of the gauges 30, 31 is responding to the sum of the two forces then coefficients for each of these forces may be determined and used as a standard for future weighing simply by using the intersection of the graphed lines or solving the simultaneous equations. When an aircraft of unknown weight is supported on the landing gear assemblies, the sensor gauges will indicate a reading. These readings are then a function of known percentages of side load and direct vertical force and two simultaneous equations of two unknowns may be formulated. These equations may then provide a simultaneous solution for the unknown desired quantity which in this instance, will be the gravitational weight of the aircraft. The solution of these equations may be performed in an electrical bridge network which provides an output directly proportional to the weighted algebraic sum of the readings of the sensor gauges.

The derivation of the equation formulating the weight of the aircraft as a function of the sensor gauge readings is shown by the following:

Assume that $T_a$ and $T_b$ are the outputs of the deflection sensors, respectively at locations $a$ and $b$ and that S and W are respectively the forces in pounds of the side load force and the gravitational weight of the aircraft affecting that landing gear. Then the following equations may express the relationship of the deflection sensor indication to these forces:

(1) $\qquad a_w W + a_s S = T_a$ (2) $\qquad b_w W + b_s S = T_b$ where $a_w, a_s, b_w, b_s$ are constants for the locations $a$ and $b$. By applying at least two combinations of known forces W and S and obtaining deflection indications as aforementioned, the values of the constants may be determined for each Equation 1 and 2 by a simultaneous solution of each of the equations.

Under actual aircraft weighing conditions the same Equations 1 and 2 may now be utilized to provide the unknown desired force. Solving for W we obtain:

(3) $\qquad W = \dfrac{(a_s/b_s)T_b - T_a}{(a_s/b_s)b_w - a_w}$ and since the constants are known, the value of W may be determined by a simple summation of the sensor indications. Instrumentation of the system is readily accomplished if the deflection sensors are strain gauges and provide a change in resistance in response to deflection. The change in resistance can cause a change in voltage which may be summed in accordance with the conditions of Equation 3 to provide a voltage output directly related to the weight supported by that landing gear and insensitive to side load forces. This voltage output may then be used in computations with similar outputs derived from the remaining gear to provide total weight and center of gravity indications of the aircraft.

Figure 3:
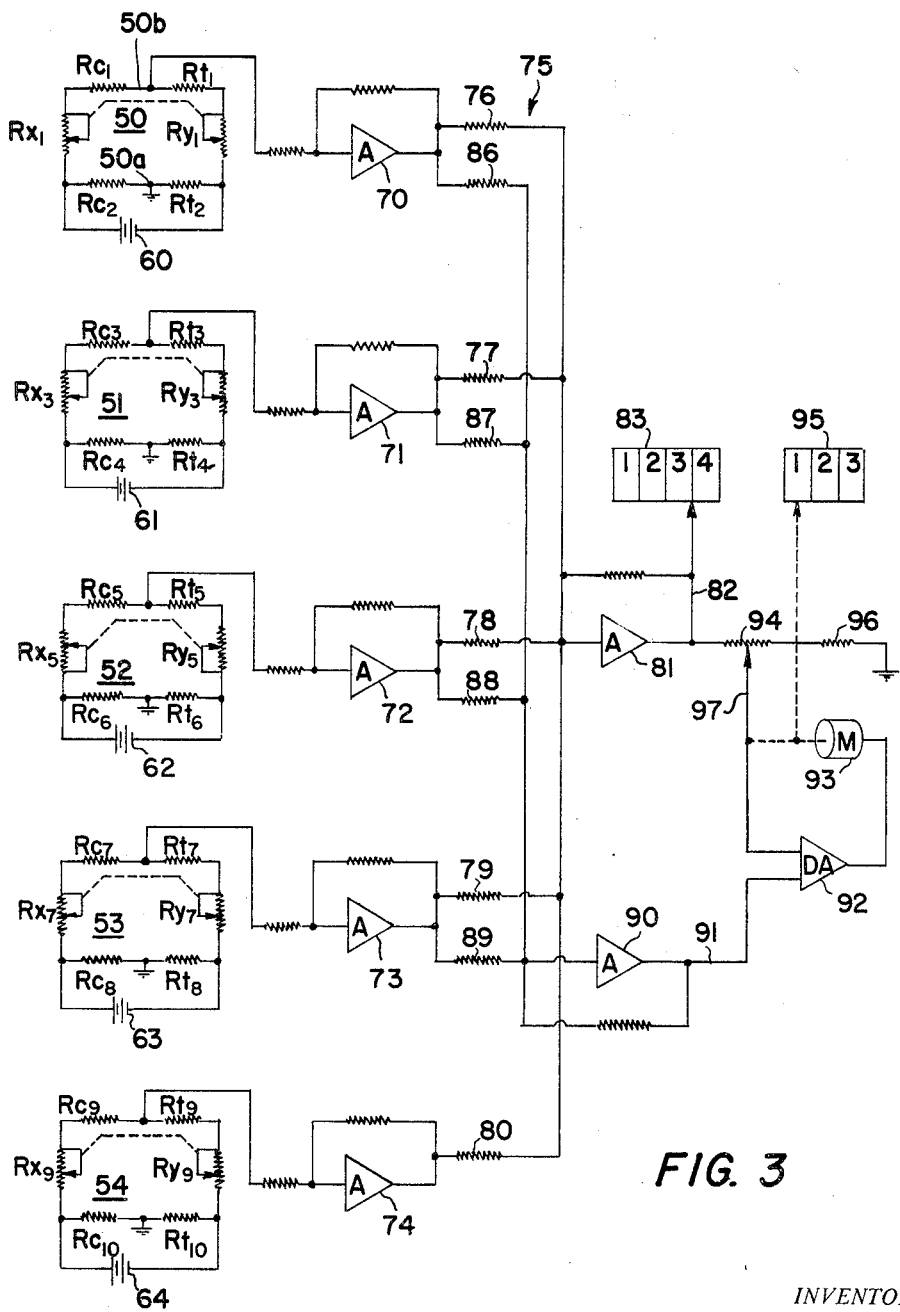
FIG. 3 is an electrical schematic of the invention showing the system for computing the total weight and the center of gravity.

Referring now to FIG. 3, there are shown five bridge circuits 50–54 which represent the sensor gauge connections in the landing gear of an aircraft having four main landing gear and a nose gear. Bridge circuits 50 and 51 show the sensor connections for the forward and rear left main landing gear, circuits 52 and 53 for the forward and rear right main landing gear and circuit 54 for the nose gear. Each of the circuits is identical in configuration and similar in operation and for purposes of this description, only circuit 50 will be detailed.

The bridge circuits 50–54 are composed of strain gauges $Rc_1$, $Rt_1$–$Rc_{10}$, $Rt_{10}$ connected to provide an output directly proportional to the weight of the aircraft upon that gear, computed in accordance with the preceding discussion describing how two sensors could be utilized for the desired indication. Strain gauges are shown in this embodiment to facilitate the understanding of this circuitry, however, it should be understood that any other device which provides an electrical change in response to deflection could be utilized in a similar circuit or even that other types of transducers could be employed if their outputs were combined in a similar manner. The strain gauges $Rc_1$, $Rt_1$–$Rc_{10}$, $Rt_{10}$ are connected in pairs to provide units which sense the deflection at particular points along the axle. Each pair consists of gauges $Rc$ and $Rt$ affixed at opposing positions on a sensor bar so that when gauge $Rc$ senses compression in the bar, gauge $Rt$ senses tension, and vice versa. Each pair of gauges $Rc$, $Rt$ corresponds to a single sensor such as the dial indicator 30 shown in FIG. 1, whose output is proportional to deflection measured at that point. Each bridge circuit 50–54 is comprised of two pairs of gauges $Rc_1$, $Rt_1$, and $Rc_2$, $Rt_2$, etc., which sense deflection at two points along any particular axle and are so connected to isolated power sources 60–64 that the voltage output of each bridge circuit is the desired function of the combination of each interconnected pair of strain gauges.

Bridge circuit 50 consists of two voltage divider circuits connected in parallel across a common power source 60. The first voltage divider consists of the strain gauge $Rc_2$ and $Rt_2$ connected in series with their common junction 50b of gauges $Rc_1$ and $Rt_1$ and passed to an op-vider consists of strain gauges $Rc_1$ and $Rt_1$ connected in series together with ganged adjustable resistors $Rx_1$ and $Ry_1$. A voltage output is taken from the common junction 50b of gauges $Rc_1$ and $Rt_1$ and passed to an operational amplifier 70 and then to summing networks 75 to be described more fully hereinafter.

To gain an understanding of the operation of the bridge circuit the following description is offered: Assume that the voltage dividers $Rc_2$, $Rt_2$ and $Rx$, $Rc_1$, $Rt_1$, $Ry$ provide a voltage at their output points 50a, 50b in correspondence with the deflection sensed by the strain gauges. That is, if $Rc_1$ is decreasing in resistance, $Rt_1$ will be increasing and the voltage output point 50b will be following in potential accordingly, as a portion of the voltage source 60. A similar condition will occur in the voltage divider $Rc_2$, $Rt_2$ at the common junction point 50a (assume the ground connection is floating). Then the voltage sensed by the operational amplifier 70 is the difference between these two potentials or the formula may be written:

(4) $$V = kT_b - T_a$$

where $T_a$ is the potential provided by the first voltage divider and $T_b$ is the potential provided by the second divider. Resistors $Rx_1$ and $Ry_1$ introduce a proportionality factor into the second voltage divider and this is defined as the constant $k$. It is seen that this Equation 4 is of the same form as Equation 3 where the constant $k$ corresponds to the ratio $a_s/b_s$. The denominator of Equation 3 is not significant since it is a constant and may easily be accounted for in the amplification stage or in the calibration of the system. In fact, in calibrating the system, it is not necessary to ascertain the exact values of any of the constants. Since known forces are being applied, it is only necessary to adjust the value of resistances $Rx$ and $Ry$ to eliminate any change in voltage output for variations of the undesired test force applied. Then the voltage output may be readily calibrated to correspond to these known and desired test forces.

In this embodiment of the invention shown in FIG. 2, it is seen that the ground connection is not floating but is a common point to which all circuits are referenced. Separate voltage sources 60–64 are supplied for each bridge circuit and it is seen that these sources are isolated and are "floating" potentials, however, it will be understood that the voltage seen by each operational amplifier 70–74 between the voltage output point 50b of the second dividers and ground is described by the above mentioned equation.

Separate voltage sources 60–64 are connected to each of the five bridge circuits 50–54 at similar points and voltage outputs are taken from each of the five bridges to provide a signal proportional to the weight supported by each of the landing gears associated with each of the bridges. The voltage outputs are passed through amplifiers 70–74 to provide an increased level for ease of computation. The amplified signal from each of the five bridges is summed in the network consisting of resistors 76–80 and amplified in amplifier 81 to provide a voltage on line 82 proportional to the total weight of the aircraft. The total weight signal is then used to drive a digit indi-cating device 83 which may be an output indicator at the load master's station or in the control compartment. The amplified bridge signal outputs from the bridges 50–53 corresponding to only the main landing gear are summed in a network consisting of resistors 86–89 and amplified in amplifier 90 to provide a signal on line 91 corresponding to the weight supported on only the main landing gear.

For making the center of gravity determination, the total weight signal on line 82 and the main gear weight signal on line 91 are combined in a difference amplifier 92 to drive a servo motor 93, a feedback potentiometer 94 and a digit indicating device 95. Since the center of gravity of an aircraft is usually given as a percent of the Mean Aerodynamic Chord, and the landing gear is in fixed relationship to the Mean Aerodynamic Chord, it is possible to determine the center of gravity with respect to the landing gear from the weight information obtained. By manual calculation for a tricycle landing gear this would be accomplished by multiplying the weight on the nose wheel by a constant which represents the distance between the nose and the main gears, and then dividing by the gross weight. For a more complex landing gear system the same type of computation is made differing in using a constant which represent a mean distance, such computation being well understood in the art and not detailed here. The result of such a computation is a measurement of the center of gravity from a specific location related to the main gear which, in turn, is directly related to the center of gravity with respect to the Main Aerodynamic Chord.

This type of computation is made in the electrical circuit by the difference amplifier 92 and displayed by means of the servo motor in a feedback loop. The total weight signal on line 82 is applied to a resistance network consisting of a potentiometer 94 in series with a resistor 96 to ground potential. The slider 97 on the potentiometer 94 is driven by the servo motor 93 and serves to pick off a part of the total weight signal. This signal and the main gear weight signal on line 91 are then applied to the inputs of the difference amplifier 92. When a difference in the two signals exists, a voltage will appear on the output of the difference amplifier which then drives the servo motor 93 and thus the slider 97 of the potentiometer 94 to a null position. that is, where there is no difference in voltage. The servo loop can be calibrated so that the position of the slider 97 of the potentiometer 94 corresponds to the location of the center of gravity with respect to the Mean Aerodynamic Chord and it is this reading which is registered at the digit indicating device 95.

Thus these embodiments of the invention have disclosed a novel system for determining and displaying true aircraft weight and center of gravity even though such aircraft is affected by transient forces. Even though the system is deceptively simple, it provides a major improvement in terms of accuracy of measurement which has not been possible in prior art systems due to the fact that these extraneous forces have largely been ignored in the past. It is not necessary, in order to make accurate measurements with this system, that the aircraft be situated in a location where ideal conditions exist, and it is possible to obtain continuous indications as the aircraft is being loaded and fueled, in locations where these operations usually take place. The reliability provided by such a fundamental system and the safety accruing from an accurate determination of gross and distributed weight are but several of the many benefits afforded by this system.

I, therefore, particularly point out and distinctly claim as my invention:

1. Apparatus for measuring the gravitational weight supported by a landing gear of an aircraft subject to side and drag load forces comprising means for sensing relative displacement at a common location between fixed points located on a horizontal section of the landing gear of the aircraft subject to complex deflection from a combination of gravitational, side and drag load forces, said fixed points lying in a plane defined by the gravitational force vector and the vector describing one of the side and drag load forces, elongated members fixedly attached to the landing gear at the fixed points for translating the deflections of said fixed points to a common location which is defined by the intersection of tangents to the elastic axis of that section of the landing gear from said points when deflection is caused solely by side and drag load forces, said displacement sensing means producing an output directly proportional to the relative deflection of said elongated members at the common location being directly proportional to only the gravitational weight of the aircraft supported by that gear.

2. Apparatus for determining the weight supported by an aircraft landing gear having a hollow axle in the landing gear subject to deflection from the gravitational weight of the aircraft and side load forces acting upon the aircraft, comprising a rigid bar coaxially mounted within said axle at a position intermediate the ends of the bar, the axle undergoing movement in relation to either end of the bar in response to the weight and side load forces, first and second members rigidly mounted on the axle beyond either end of said bar and extending toward said bar, first and second relative displacement sensors fixedly mounted on said members operatively adjacent either end of said bar and adapted to emit a signal varying in strength in direct proportion to the relative movements of said axle, and weight computing means in circuit with and actuated by said sensors.

3. Apparatus for determining the weight supported by an aircraft bogie landing gear including a main beam pivotally mounted on the landing gear strut and supporting perpendicularly-disposed wheel-bearing axles at either end, the beam being subject to deflection from the gravitational weight of the aircraft and drag load forces acting upon the aircraft, comprising a rigid bar fixedly mounted on the exterior of said bogie gear intermediate said strut and one of said axles in a plane parallel to the plane described by said weight and drag forces, deflection sensing devices fixedly mounted on said beam operatively adjacent either end of said bar to produce signals manifesting the relative movements of the portion of the beam on which said sensors are mounted in respect to the end of said bar, and weight computing means in circuit with and responsive to the signals of said sensing devices to subtractively combine such signals to produce an indication of the gravitational weight of the aircraft.

References Cited

UNITED STATES PATENTS

| | | | |
|---|---|---|---|
| 2,615,330 | 10/1952 | Blackmon et al. | 73—65 |
| 2,754,107 | 7/1956 | Ernst et al. | 177—211 |
| 2,735,291 | 2/1956 | Quinn | 73—65 |
| 2,759,356 | 8/1956 | Blackmon et al. | 73—65 |
| 2,872,807 | 2/1959 | Kolisch | 73—65 |
| 2,932,188 | 4/1960 | Kennedy | 73—65 |
| 2,933,302 | 4/1960 | Cordell. | |
| 3,063,638 | 11/1962 | Kolisch | 73—65 |
| 3,194,058 | 7/1965 | Kurkjian | 73—65 |
| 3,203,234 | 8/1965 | Westcott et al. | 73—65 |
| 3,310,976 | 3/1967 | Bussell et al. | 73—65 |

OTHER REFERENCES

Stan— For Aircraft Take-off Weight and Balance, by Barry J. Hawkins, February 1965, Instrument and Control Systems, pp. 89–93, vol. 38.

CHARLES A. RUEHL, Primary Examiner

U.S. Cl. X.R.

177—136